March 13, 1945.  A. F. HICKMAN  2,371,169
SPRING SUSPENSION FOR RAILROAD CARS
Filed July 1, 1942  2 Sheets-Sheet 1
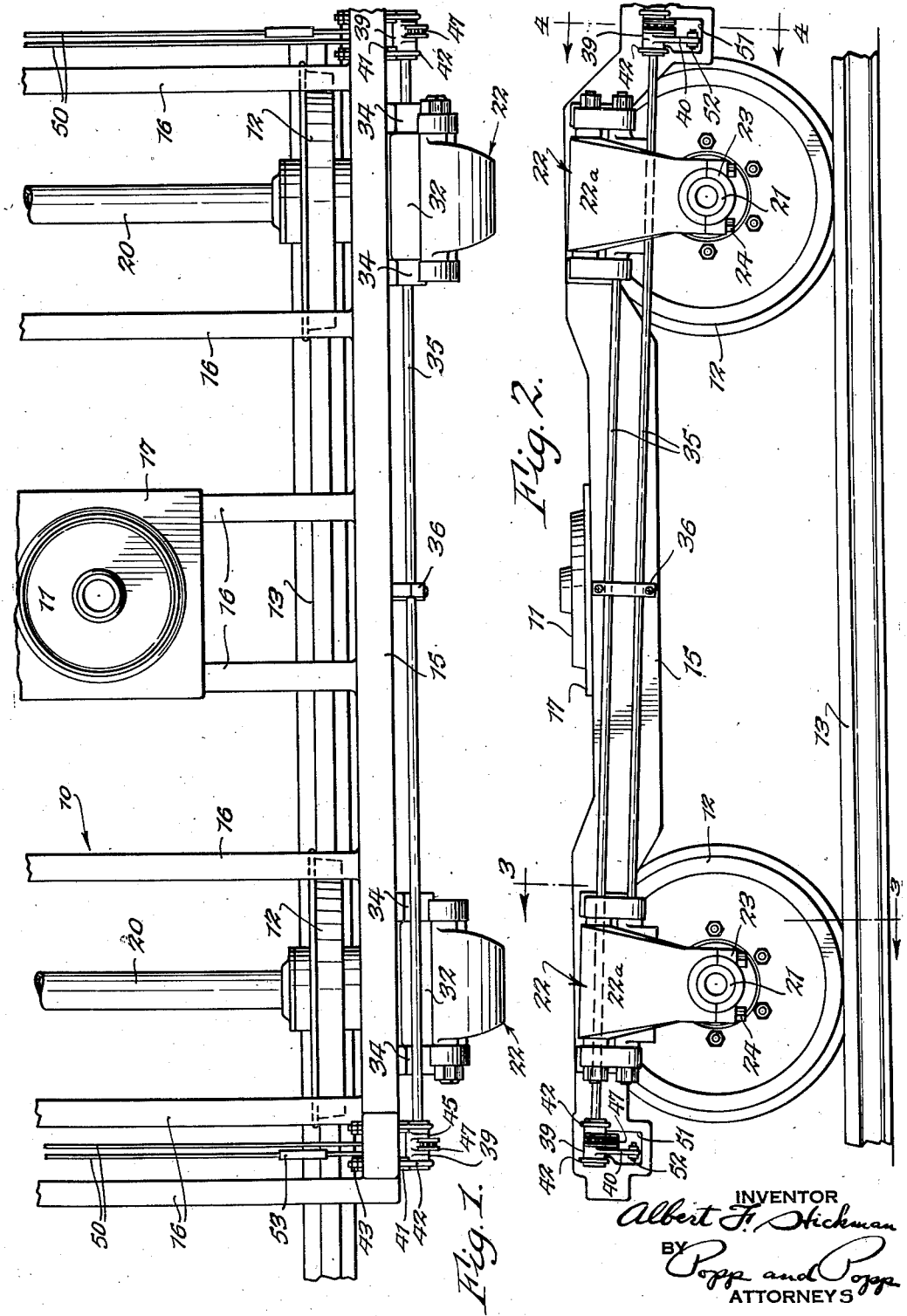
INVENTOR
Albert F. Hickman
BY
Popp and Popp
ATTORNEYS March 13, 1945.  A. F. HICKMAN  2,371,169
SPRING SUSPENSION FOR RAILROAD CARS
Filed July 1, 1942  2 Sheets-Sheet 2
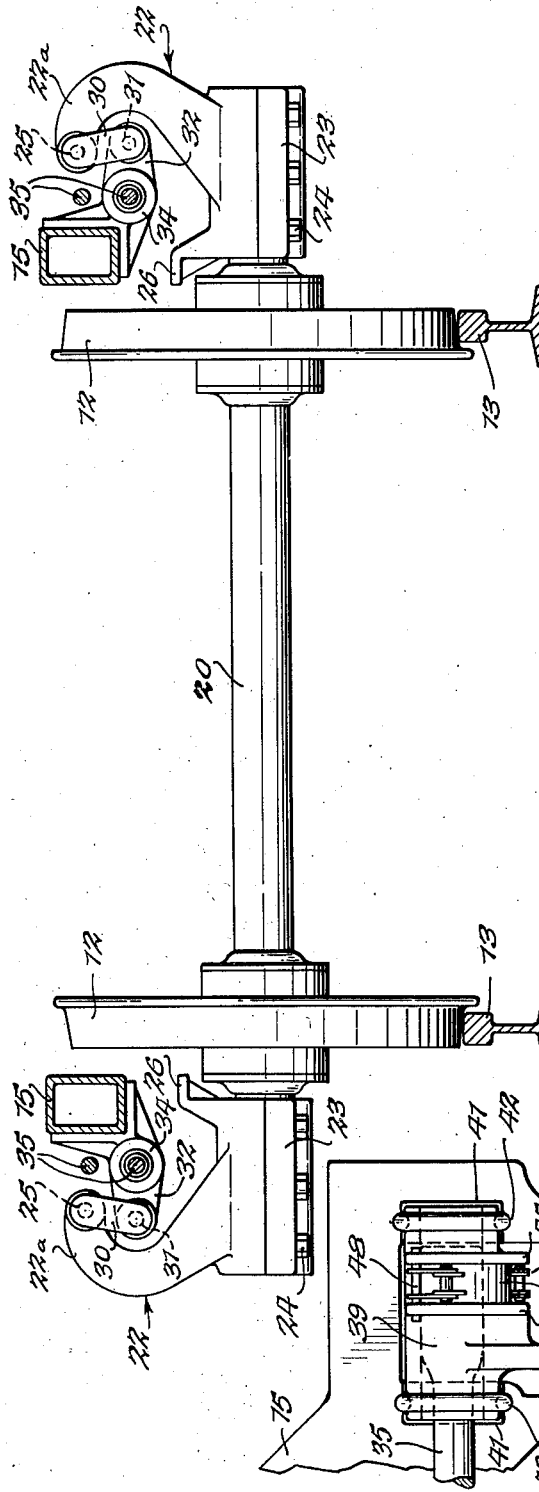
INVENTOR
Albert F. Hickman
BY
Popp and Popp
ATTORNEYS Patented Mar. 13, 1945

2,371,169

UNITED STATES PATENT OFFICE 2,371,169

SPRING SUSPENSION FOR RAILROAD CARS

Albert F. Hickman, Eden, N. Y., assignor to Hickman Pneumatic Seat Co. Inc., Eden, N. Y., a corporation of New York Application July 1, 1942, Serial No. 449,226

11 Claims. (Cl. 105—182)

This invention relates to a spring suspension for railroad cars and more particularly to such a spring suspension adapted for supporting the car of a passenger train where speed of travel, safety, comfort and stability are of prime importance, although the suspension is also adapted for use in conjunction with freight cars.

This application is a continuation in part of my copending application for Spring suspension for railroad cars, Serial No. 374,515, filed January 15, 1941.

One of the principal objects of this invention is to provide a spring suspension for railroad cars which will function to safely support the car body at the high speeds required in passenger train service.

Another object of the invention is to provide such a spring suspension for the cars of passenger trains which has the necessary features of safety both against breakage and also to insure the car being solidly supported on the tracks at all rail speeds.

Another object is to provide a suspension which has an additional feature of safety in the provision of means for preventing derailment even if a spring should break, these means embodying essentially tension members so as to be light in weight and reliable in operation as compared with the compression bars used for the same purpose in my said copending patent application of which this is a continuation in part.

Another object of the invention is to provide an improved bottoming means for solidly supporting the truck frame directly on the axle in the event of spring breakage, the dead ends of the springs for each axle being cross connected so that one spring is rendered inoperative in the event of its companion spring breaking, both ends of the axle being thereby brought into solid setting engagement with the truck frame in the event of the breakage of either of the springs.

Another object is to provide a spring suspension in which the spring is provided by torsion rods and in which the torsion rods are of maximum length.

Another object of the invention is to provide a spring suspension in which both up and down wheel movement is resiliently opposed by a purely geometric resilient resistance instead of an arithmetic or partially arithmetic and partially geometric resilient resistance.

Another object of the invention is to provide such a spring suspension which provides for the lateral cushioning of the car body as well as its vertical cushioning thereby to absorb lateral impacts imposed upon the car body as well as vertical impacts.

Another object of the invention is to provide such a spring suspension having high and wide spring suspension pivot positions. By the high and wide suspension pivot positions of the present invention stability is increased and the need for anti-body roll devices, such as torsion bar stabilizers, is eliminated. By eliminating these anti-body roll devices the same frequencies can be maintained regarding body roll as are developed for vertical movements.

Another object of the invention is to provide such a suspension in which the friction in the spring suspension can be reduced to any desired degree, this object being attained by the use of torsion rods as the resilient means with provision for holding the stress upon these torsion rods low enough to develop extremely long life with very light rods.

Another object of the invention is to provide such a spring suspension which can incorporate large oversized bearings and large grease reservoirs and grease retainers.

Another object is to provide such a spring suspension which does not incorporate axle compensation, axle compensation involving the use of devices to distribute the load to the two or more axles supporting each end of the car. By eliminating axle compensation the weight of the suspension is materially reduced; parts are eliminated; effective spring centers wider than the track can be developed to permit the use of softer springs and thereby obtain improved ride characteristics; and high and wide suspension pivot positions can be employed thereby to obtain increased stability.

Another object of the invention is to provide such a suspension which can be provided with resilient means whereby each axle is permitted to move a slight distance longitudinally of the car body thereby to resiliently resist longitudinal impacts such as occur in applying the brakes or in coupling cars, and in some instances to increase stability by eliminating or preventing wheel tramp or wheel hop.

Another object of the invention is to provide such a spring suspension which is itself light in weight and also is adapted to be used in conjunction with light-weight bodies and equipment, such light-weight bodies and equipment being desirable with the use of increased rail speeds.

Another object of the invention is to provide such a spring suspension which can be used in conjunction with swivel trucks such as are now generally employed to support the bodies of passenger cars.

Another object of the invention is to provide such a spring suspension in which the violent diving of the truck from side to side of the track, particularly at high speed, is eliminated.

Another object of the invention is to provide such a suspension for the swivel truck of a passenger car which permits of the truck being held in fixed relation to the passenger car body except for its swiveling movement around the axis of the king pin, it being unnecessary to permit tilting movements of the truck to take care of conditions, such as the tendency of one wheel to rise off the track, caused by spring breakage. With conventional trucks, which are free to tilt or move up and down independently of the car body, truck diving, wheel tramp, and wheel hop are encouraged, especially at high speed.

Another object of the invention is to provide such a suspension which will support the car body in such manner that zero side sway and even a slight negative sway control can be provided even with the high centers of gravities of conventional passenger car bodies.

Another object of the invention is to provide such a suspension which is adapted for use in conjunction with railroad equipment now in use, thereby permitting of equipping cars now in use with a spring suspension forming the subject of the present invention.

Another object of the invention is to provide a suspension having the foregoing advantages and which can be arranged entirely below the floor of a conventional passenger car.

Another object of the invention is to provide such a spring suspension having many operating economies, such as the saving of fuel; the saving in wear of the tracks and wheels; and the saving in the cost of maintenance of the car bodies.

Another object of the invention is to provide such a suspension in which the wheels are of a simple demountable type, easy to change and economical to build.

Another object of the invention is to provide such a spring suspension in which each entire axle assembly can be readily removed as a unit.

Another object of the invention is to reduce to a minimum the unsprung weight of the suspension.

Another object of the invention is to provide such a suspension which eliminates wheel hop and wheel tramp.

Other objects and advantages of the invention will be readily apparent from the foregoing description and accompanying drawings, wherein:

Fig. 1 is a fragmentary top plan view of a swivel truck having a spring suspension embodying my invention and adapted to support one end of a passenger car body.

Fig. 2 is a side elevation of the swivel truck shown in Fig. 1.

Fig. 3 is a vertical section, taken on line 3—3, Fig. 2.

Fig. 4 is a fragmentary vertical section, taken on line 4—4, Fig. 2 and showing the manner in which the dead or anchored ends of a pair of torsion rods supporting the opposite ends of a particular axle are interconnected by tension members so that the breakage of one rod will render the companion rod inoperative and permit the truck frame to seat directly on the axle brackets.

Fig. 5 is an enlarged fragmentary side elevation similar to Fig. 2 and showing in detail the anchorage for one of the torsion rods.

The passenger car body, which is not illustrated, is adapted to be mounted on a swivel truck, indicated generally at 10, by means of a center bearing 11, this truck being shown as supported on four flanged railroad wheels, indicated generally at 12, by the spring suspension embodying my invention. These four flanged railroad wheels of each truck ride upon the rails 13 of the railroad track and the passenger car body is supported at each end on one swivel truck in the usual and well known manner so that each truck supports half the weight of the car body. It will also be understood that while a four wheeled truck is shown, the invention can be embodied in a six wheeled truck.

The frame of the swivel truck 10 is shown as made in the form of a steel casting, although it will be understood that it can be made of structural steel. The truck is shown as having two longitudinal side beams 15 connected by integral cross beams 16, the center pair of which are employed to support the plate 17 of the center bearing 11. This center bearing can be of unusually large effective diameter, it being feasible to employ center bearing plates having an effective diameter of as much as twenty-four inches. This is possible because with the present spring suspension the truck can be held in fixed relation to the passenger car body except for swiveling about the axis of the center bearing 11 and it is unnecessary to permit tilting movements of the truck to take care of the tendency of one wheel to rise off the track, caused by spring breakage and to take care of truck diving, wheel tramp and wheel hop.

The wheels 12 are shown as being mounted for independent rotation at opposite ends of the axles 20. The bearings for this purpose can be of the form shown in my said copending application Ser. No. 374,515. While the invention is not limited to such independent wheel rotation, it is preferable to employ wheels which are independently mounted on the axles to avoid wheel and track wear, such as causes the development of secondary flanges which is the result of wheel slippage on curves or straightaways. Such wheel slippage also encourages wheel tramp, wheel hop and truck diving, besides consuming additional power directly in proportion to the amount of slippage. It is apparent that such slippage is inherent to wheels which are fixed to a common axle, as on curves especially where one wheel must traverse a greater length of rail than the other. Also with fixed wheels, at high speeds, the inertia of these assemblies tends to carry the truck past the car rolling position of the car wheels. This side to side action of the truck in endeavoring to find the car rolling position of the wheels results in recurring wheel slippage. This condition is avoided in the employment of wheels having independent rotation around a common axle and in a rigidly constructed truck frame which allows for correct and constant axle alinement.

Each axle 20 is extended at its opposite ends beyond the hubs of its wheels, as indicated at 21. To each of these extensions 21 of the axles is secured an axle bracket, indicated generally at 22. As the axle, in the form of the invention shown, does not rotate, each axle bracket 22 is provided at its lower end with a socket which receives the upper half of the corresponding end of the axle and this end of the axle is clamped in this socket by a clamping plate 23 having a socket to receive the lower half of the axle and secured to the underside of the bracket 22 by screws 24 or in any other suitable manner. Each axle bracket 22 flares outwardly from its lower end, and the upper end of this bracket is of gooseneck form, its extreme upper end 22a curving inwardly and supporting an axle pivot pin 25 which is journaled at its extreme end. This axle pivot pin is shown as being disposed at an angle to the horizontal for a purpose hereinafter set forth and as extending fore and aft of the truck. The axle pivots 25 are also arranged parallel with one another. This axle pivot pin 25 can be journaled in the axle bracket 22 in any suitable manner, such as in the manner illustrated in detail in my said copending application Ser. No. 374,515. Each of the axle brackets 22 is also formed at its inner end to provide an upwardly projecting stop or bumper 26 which is arranged directly under the corresponding side beam 15 of the truck. The side bars of the truck are adapted to seat directly on the stops or bumpers 26 in the event of spring breakage as hereinafter described.

The pair of shackles 30 are secured to the opposite ends of each of the axle pivot pins 25 and the lower ends of each pair of these shackles are secured to the opposite ends of a crank arm pivot pin 31. Each of the crank arm pivot pins 31 is journaled in the outer end of a horizontal outwardly extending crank arm 32 and is arranged parallel with the corresponding crank arm pivot pin 25.

For this purpose each crank arm 32 is extended a substantial extent lengthwise of the vehicle and is journaled at its front and rear ends in a pair of bearings 34 which are in turn secured to the corresponding side beam 15 of the truck frame. The axis of rotation of each crank arm 32 is parallel with the corresponding pivot pins 25 and 31. The journaling of each crank arm 32 in the bearings 34 can be through the medium of a sleeve, as shown in my said copending application Ser. No. 374,515 or these crank arms can be journaled directly upon the supporting torsion rods 35 through the medium of a rubber sleeve which also serves to provide the journal between the torsion rod and the bearings 34 in the manner shown in my copending application for Torsion rod spring suspension, Ser. No. 432,405, filed February 26, 1942. The precise bearing structure for the crank arms 32 forms no part of the present invention, it being essential, however, that these crank arms be journaled on the side beams 15 of the truck frame and that they be secured to the live end of a corresponding torsion rod 35, these torsion rods extending along the outer faces of the side beams 15 of the truck frame and being arranged at a slight angle to the horizontal and parallel with the axle pivot pin 25, crank arm pivot pin 31 and the axis of rotation of the crank arm 32. The primary purpose of arranging these torsion rods 35 and the pivots 25, 31 and axis of the bearings 34 at such a slight angle is to maintain them in axial parallelism with one another and at the same time to permit of anchoring the dead end of each torsion rod at the opposite extremity of the truck frame and beyond the companion axle at this opposite extremity. Thus it will be noted that the torsion rod 35 for the right hand axle, as viewed in Fig. 2, because of this inclination, extends above the crank arm 32 for the left hand axle and to the extreme left hand end of the corresponding side beam 15 of the truck frame. Similarly, the torsion rod 35 for the left hand axle, because of this inclination, extends below the crank arm 32 for the right hand axle and to the extreme right hand end of the corresponding side beam 15 of the truck frame. By this means the torsion rods 35 can be made longer and can be made the maximum length permitted by the length of the truck frame. To prevent the torsion rods from whipping they are preferably supported at their centers in a bearing block 36 provided on the outer faces of the side beams 15 of the truck frame. The dead ends of the torsion rods are anchored on the truck frame so as to prevent these dead ends from turning, the springing means between the axles and the truck frame being provided by the twisting of the torsion rods. However, the dead ends of the torsion rods 35 at opposite ends of either axle are interconnected so that if one of these torsion rods should break its companion torsion rod is instantly rendered inoperative and the corresponding end of the truck seats upon the corresponding pair of stops or bumpers 26.

For this purpose the live end of each torsion rod 35 is preferably enlarged and ovalled in the manner set forth in my United States Patent No. 2,213,004, dated August 27, 1940, and is fitted in the ovalled bore 38 in the hub 39 of a depending crank arm 40. The opposite ends of each of these hubs 39 are fitted against bearing blocks 41 on the side beams 15 of the truck frame and are held against these bearing blocks by a pair of U-bolts 42 which embrace the opposite ends of each hub 39 and the legs of which extend through the corresponding side beam 15 of the truck frame and are secured by nuts 43. Each of the hubs 39 is also provided on its outer side with a pair of flanges 45 which are spaced to provide an arcuate track 46 for a chain 47. Each of these chains is secured at one end to a pin 48 extending across the upper end of the channel or track 47 formed between the flanges 45 and this chain extends around the arcuate track 46 and has its free lower end extending inwardly and connected to a tension rod 50. Each of the tension rods extends through an aperture 51 provided in the corresponding side beam 15 of the truck frame and its opposite end is pivoted to the lower end of the companion crank arm 40 on the directly opposite side of the truck, as indicated at 52, the adjacent rods 50 thereby crossing each other. Each of the rods 50 is preferably made in two sections connected by a turnbuckle 53 so that the effective length of these rods 50 can readily be adjusted.

In the operation of the invention, as shown in the drawings, upward movement of the end of any axle effects, through the corresponding axle pivot pin 25, shackles 30 and lever arm pivot pin 31, an upward movement of the corresponding lever arm 32, this lever arm swinging about the axis of its bearings 34. This upward movement of this crank arm 32 effects a corresponding twisting of the corresponding torsion rod 35, the torsion rod thereby yieldingly resisting upward movement of the end of the axle and yieldingly restoring the axle end to its original position.

It will be seen that when the end of the axle is so forced upwardly relative to the truck frame (or vice versa, when the truck frame is forced downwardly relative to the axle under the influence of momentum), the effective resilient opposing force of the torsion rod 35 increases at a geometric and not an arithmetic rate. This geometric rate is of the accelerated increased type in which increments of vertical movements of the axle are opposed by an accelerated rate of resilient resistance. This is primarily due to the progressive decrease in the effective length of the lever arm 32 as these lever arms swing upwardly and inwardly about the live end of the torsion rods 35 as the axis of rotation. This action is also influenced by the varying angularity of the shackles 30 and the fact that increments of vertical displacement of the lever arm pivot pins 31 cause accelerated rates of increase in the angular displacement of the torsion rods. This latter is due to the fact that increments of vertical movement of each lever arm pivot pin 31 are not proportional to the accompanying increments of angular twisting to which its companion torsion rod is subjected.

This geometric action also occurs when the end of the axle moves downwardly relative to the truck frame from the normal position shown in Fig. 3. Throughout this particular movement, the geometric action is of the accelerated decreased type, that is, as the axle passes through increments of downward movement, the rate of decrease of the resilient force tending to push said axle downwardly increases. Thus, as the end of the axle moves downwardly from the position shown in Fig. 3, the resilient force tending to push it downwardly decreases at an accelerated rate.

It will also be observed that the suspension is non-bottoming in that the line of pressure derived from the axle and directed against either pin 31 at the outer end of the corresponding lever arm 32 is able to pass through the axis of the lever arm. In other words, in the suspension shown each lever arm 32 and its shackles 30 are capable of straightening out so that the pivots 25 and 31 come into line with the axis of the lever arm 32. However, this straightening out of each lever arm and its shackles is resisted by the corresponding torsion rod and since it would take an infinite force to actually straighten the lever arm and shackles out, when so resisted, the suspension is inherently non-bottoming. It will also be seen that while the effective resistance of the torsion rods 100 can build up to infinity, they can never be stressed beyond the limited degree of angular movement permitted by the lever arms 32 in approaching a straightened out relation with the shackles 30.

It is to be noted that the shackles 30 incline upwardly and inwardly from the lever arm pivot 31 to the axle pivot 25. This arrangement has two distinct advantages. One effect of this upward and inward angular shackle arrangement is that it causes the truck at each end of the car body, on which trucks the car body is mounted, to always tend to centralize itself. This centralizing tendency is caused by the effect of gravity which may be considered as a resilient downwardly acting force acting between the truck and the track bed and operating in a manner identical in its effects to a metal spring connecting the truck and the track bed. It is to be distinctly understood that this force tending to centralize each truck is of a resilient nature. Because of this fact the car body is not subjected to directly connected lateral forces as a consequence of a lateral axle movement. Such a lateral axle movement occurs, for instance, in traversing curves in a track and also when the truck moves horizontally from side to side in centering itself with reference to the track.

While rail cars do not have the high vertical wheel movements caused by rough roads, heavy lateral thrusts do develop when traveling on rails, due to many other causes. With the present spring suspension all lateral thrusts directed against the axle and wheel assembly are resiliently resisted, except those resulting directly from the weight of the axle, wheels and small axle brackets. In other words, when a train hits a curve at high speed, the weight of the truck will not produce a hammer-like blow against the wheels when the wheels are suddenly caused to move laterally. The wheels will start to move laterally and when the resiliently applied lateral pressure builds up high enough to turn the truck and move the car laterally, the truck and car are moved as a result of a resilient force and not that of a hammer blow. Another important advantage obtained by the angular arrangement of the shackles 30 is that it reduces the possibility of wheel tramp. This latter may be broadly defined as a periodic vibration of the axle in a vertical transverse plane, the definition being usually limited to a rotary movement about an axis of rotation located at some point in the axle. In general it may be said that if one wheel is lifted, and if this movement causes a downward thrust on the opposite wheel, then wheel tramp results. Such wheel tramp is prevented in the present invention by insuring that the downward thrust of the axle pivot 25 lies at or outside of the vertical plane intersecting the contact of the wheel with the track. It will be noted that by arranging the linkage of the present spring suspension outside of the wheels, the downward thrust of each axle pivot 25 is well outside of the track. Therefore the vertical upward thrust against one wheel is opposed by a directly opposite force passing through the corresponding axle pivot 25 and hence no downward thrust is imposed upon the opposite wheel.

It will also be seen that by arranging the linkage outside of the wheels of the truck, as shown, the effective spring centers or suspension pivot points are at least 25% of the track width outside of the wheels at each side of the truck. With such wide effective spring centers the result obtained when one wheel rises one inch is that there is a spring deflection of one and one-quarter inches. With a conventional truck suspension, with the effective spring centers well within the wheels, when one wheel rises one inch there is a spring deflection of substantially less than one inch. The suspension of the present invention, by virtue of the wide effective spring centers, which permit the use of softer springs, provides a marked increase in stability and a marked improvement in ride as compared with conventional trucks.

The high and wide suspension pivot positions also eliminate the need for anti-body roll devices, such as torsion bar stabilizers and the like. By eliminating these anti-body roll controlling means, substantially the same frequencies can be maintained regarding body roll as are developed for vertical movements, thereby to greatly improve the ride characteristics of the suspension.

It will also be noted that all brake torque is resisted by the axle brackets, shackles, lever arms and their connecting pivots. Thus, by the wide spacing of the bearing heads 34 it will be seen that all brake torque is resisted directly by the linkage which connects each end of each axle with the car body and is not transmitted to the torsion rods 35.

It is also to be noted that in the present suspension the means whereby resilience is effected does not involve any frictional resistance, such as occurs in the case of a conventional leaf spring and hence is free and non-energy absorbing in its action. Also, having no frictional resistance, except bearings, which afford no particularly difficult lubrication problems, it does not vary because of change of frictional resistance as in the case of the conventional leaf spring. As in the present invention all forces, both vertical and horizontal, are resiliently resisted by structure between the axles and the truck frame, the truck frame can be held in fixed relation to the car body except for swiveling movement about the axis of the king pin. This permits of the use of a center bearing 11 of exceptionally large diameter.

The linkage forming the subject of the present invention is so designed that the torsion rods 35 are not subjected to stresses approaching more than one-half their elastic limits and therefore there is little danger of these torsion rods breaking. It will be appreciated, however, that a torsion rod may be produced with a flaw or other imperfection which will cause it to break in service. Particularly with the arrangement of the invention with the load of the body carried outside of the car wheels, it is desirable that when one torsion rod breaks, its companion rod at the opposite end of the same axle be instantly rendered completely inoperative so that the axle becomes springless at both ends instead of merely at one end, the truck frame solidly seating upon the two seats 26 at the corresponding end of the frame when this occurs. In the absence of such provision for rendering the opposite torsion rod instantly inoperative, the axle would be unsprung at one side and sprung at its opposite side which would tend to raise the wheel at the end of the axle with the broken spring up off the axle and thereby possibly cause derailment of the particular axle affected which might possibly result in derailment of the entire car. This condition would be the same in conventional trucks with an enlarged center bearing or with the truck mounting not permitting truck frame vertical freedom in relation to the car body.

With the present suspension, it will be seen that the companion torsion rods for either axle are twisted in opposite directions and that the vertically extending lever arms 40 are so arranged as to be urged outwardly away from each other by the load imposed upon these rods. Assuming that the torsion rod 35 shown in the right of Fig. 4 breaks for any reason, the load directly imposed upon this torsion rod by the sprung weight is, of course, removed and the truck frame settles upon the corresponding bumper or projection 26. In this event the forces being transmitted by the tension rods 50 on the left side find no resistance and the right arm 40 is swung inwardly or rotated in a counterclockwise direction into the corresponding opening 51 of the truck frame. This left arm 40 is thereby permitted to swing to an inoperative position. It will therefore be seen that when a torsion rod on one side of the car truck breaks, the torsion rod on the opposite side of the truck is rendered instantly inoperative thereby to prevent any raising of the opposite wheel which might result in derailment of the passenger train.

At the same time it will be seen that no loads are transmitted from one torsion rod of any axle to its other torsion rod because of the difference in effective leverage between the length of the lever arms 40 and the hubs of these lever arms around which the chains 47 pass. Thus, an excess load on the right hand lever arm 40, as viewed in Fig. 4, is not effective to appreciably increase the stress upon the left hand torsion rod because the opposite end of its tension rod 50 is connected to the chain which winds around the hub of the lever arm 40 at the left side of this truck, as viewed in this figure.

From the foregoing it will be seen that the present invention provides a spring suspension having all of the advantages inherent in the spring suspension shown in my said copending application Ser. No. 374,515 and at the same time permits of using torsion rods of greater length, the torsion rods for one axle extending beyond the companion axle and being anchored at the extremity of the truck frame. Further, it will be seen that the present invention provides a simple and effective means for rendering any torsion rod inoperative when its companion torsion rod breaks and that these means are under tension, in contrast to being under compression, thereby permitting of very light tension members to be used for this purpose. It will further be seen that the present invention provides a very simple means for seating either end of the truck directly on the axles when such torsion rod breakage occurs.

I claim as my invention:

1. A spring suspension for carrying the body supporting frame of a railroad car, comprising an axle, a car wheel supporting each end of said axle, a pair of torsion rods mounted on said frame, means operatively connecting the live end of each of said torsion rods with the corresponding end of said axle to resiliently resist vertical movement of said axle relative to said frame, and means providing the sole anchorage for the dead end of each torsion rod to prevent the rotation thereof relative to said frame, comprising a crank arm fast to the dead end of each of said torsion rods, and means normally under tension operatively connecting said crank arm of one of said torsion rods with the crank arm of the other torsion rod and releasing the crank arm of either torsion rod when the other torsion rod breaks thereby to render both torsion rods completely inoperative when one breaks.

2. A spring suspension for carrying the body supporting frame of a railroad car, comprising an axle, a car wheel supporting each end of said axle, a pair of torsion rods mounted on said frame in generally parallel relation to each other and having their dead ends arranged in a common plane extending transversely of said torsion rods, means operatively connecting the live end of each of said torsion rods with the corresponding end of said axle to resiliently resist vertical movement of said axle relative to said frame, said means being arranged to twist said torsion rods in opposite directions, a crank arm secured to the dead end of each of said torsion rods and extending in a generally vertical direction therefrom, said crank arms being arranged to be urged outwardly away from each other by the load imposed upon said torsion rods, an elongated flexible tension member pivotally connected to the outer end of each of said crank arms and pivotally secured to the dead end of the other torsion rod at a point located radially outward from its axis a distance less than the effective length of its said crank arm, said tension members normally preventing the transmission of load from one torsion rod to the other and operating to release the crank arm of either of said torsion rods in the event of the other torsion rod breaking.

3. A spring suspension for carrying the body supporting frame of a railroad car, comprising an axle, a pair of torsion rods mounted on said frame in generally parallel relation to each other and having their dead ends arranged in a common plane extending transversely of said torsion rods, means operatively connecting the live end of each of said torsion rods with the corresponding end of said axle to resiliently resist vertical movement of said axle relative to said frame, said means being arranged to twist said torsion rods in opposite directions, a crank arm having a hub secured to the dead end of each of said torsion rods and extending in a generally vertical direction therefrom, said crank arms being arranged to be urged outwardly away from each other by the load imposed upon said torsion rods, an elongated flexible tension member pivotally connected to the outer end of each of said crank arms and pivotally secured to the hub of the other crank arm adjacent the periphery thereof, said tension members crossing each other and normally preventing the transmission of load from one torsion rod to the other and operating to release the crank arm of either of said torsion rods in the event of the other torsion rod breaking.

4. A spring suspension for carrying the body supporting frame of a railroad car, comprising an axle, a pair of torsion rods mounted on said frame in generally parallel relation to each other and having their dead ends arranged in a common plane extending transversely of said torsion rods, means operatively connecting the live end of each of said torsion rods with the corresponding end of said axle to resiliently resist vertical movement of said axle relative to said frame, said means being arranged to twist said torsion rods in opposite directions, a crank arm having a hub secured to the dead end of each of said torsion rods and extending in a generally vertical direction therefrom, said crank arms being arranged to be urged outwardly away from each other by the load imposed upon said torsion rods, a pair of U-bolts having their legs anchored in said frame and embracing and rotatably supporting each of said hubs, an elongated flexible tension member pivotally connected to the outer end of each of said crank arms and pivotally secured to the hub of the other crank arm adjacent the periphery thereof, said tension members crossing each other and normally preventing the transmission of load from one torsion rod to the other and operating to release the crank arm of either of said torsion rods in the event of the other torsion rod breaking.

5. A spring suspension for carrying the body supporting load of a railroad car, comprising an axle, a car wheel supporting each end of said axle, a pair of torsion rods mounted on said frame in generally parallel relation to each other and having their dead ends arranged in a common plane extending transversely of said torsion rods, means operatively connecting the live end of each of said torsion rods with the corresponding end of said axle to resiliently resist vertical movement of said axle relative to said frame, said means being arranged to twist said torsion rods in opposite directions, a hub secured to the dead end of each of said torsion rods, a crank arm secured to each of said torsion rods and extending in a generally vertical direction therefrom, said crank arms being arranged to be urged outwardly away from each other by the load imposed upon said torsion rods, an elongated tension member pivotally connected to the outer end of each of said crank arms, the other end of each of said tension members being flexible and being wrapped around and secured to the hub of the other torsion rod, said tension members normally preventing the transmission of load from one torsion rod to the other and operating to release the crank arm of either of said torsion rods in the event of the other torsion rod breaking.

6. A spring suspension for carrying the body supporting load of a railroad car, comprising an axle, a car wheel supporting each end of said axle, a pair of torsion rods mounted on said frame in generally parallel relation to each other and having their dead ends arranged in a common plane extending transversely of said torsion rods, means operatively connecting the live end of each of said torsion rods with the corresponding end of said axle to resiliently resist vertical movement of said axle relative to said frame, said means being arranged to twist said torsion rods in opposite directions, a crank arm having a hub secured to the dead end of each of said torsion rods and extending in a generally vertical direction therefrom, said crank arms being arranged to be urged outwardly away from each other by the load imposed upon said torsion rods, an elongated tension member pivotally connected to the outer end of each of said crank arms, the other end of each of said tension members initially engaging the same side of the hub of the other torsion rod from which its crank arm projects and being flexible and wrapped around the hub so engaged and being secured thereto, said tension members being crossed and normally preventing the transmission of load from one torsion rod to the other and operating to release the crank arm of either of said torsion rods in the event of the other torsion rod breaking.

7. A spring suspension for carrying the body supporting load of a railroad car, comprising an axle, a car wheel supporting each end of said axle, a pair of torsion rods mounted on said frame in generally parallel relation to each other and having their dead ends arranged in a common plane extending transversely of said torsion rods, means operatively connecting the live end of each of said torsion rods with the corresponding end of said axle to resiliently resist vertical movement of said axle relative to said frame, said means being arranged to twist said torsion rods in opposite directions, a crank arm having a hub secured to the dead end of each of said torsion rods and extending in a generally vertical direction therefrom, said crank arms being arranged to be urged outwardly away from each other by the load imposed upon said torsion rods, said hub of each crank arm being formed to provide a circumferentially extending channel, an elongated tension member pivotally secured to the outer end of each of said crank arms, the other end of each of said tension members being arranged in the channel of the hub of the other torsion rod and initially engaging the same side of said hub from which its crank arm projects and being flexible and wrapped around said hub and secured thereto, said tension members being crossed and normally preventing the transmission of load from one torsion rod to the other and operating to release the crank arm of either of said torsion rods in the event of the other torsion rod breaking.

8. A spring suspension for carrying the body supporting frame of a railroad car, comprising a pair of spaced axles arranged in substantially the same horizontal plane, a car wheel supporting each end of each of said axles, an axle bracket mounted on each end of each of said axles and having its upper end arranged outside of the vertical plane of the annular line of contact of the adjacent car wheel with its rail, a pair of torsion rods mounted on each side of said frame at a slight angle to the horizontal and extending transversely of said axles and arranged one above the other and each having its live end arranged above the end of a corresponding axle and its dead end extending beyond the end of the other axle, means for anchoring said dead end of each torsion rod to said frame at a point beyond said end of the other axle, a crank arm secured to the live end of each torsion rod and a shackle pivotally connecting the outer end of each crank arm with the adjacent axle bracket and extending downwardly from said axle bracket to said crank arm, said crank arms, shackles and axle brackets permitting vertical and lateral movement of said axles relative to said frame and said movement being yieldingly resisted by said torsion rods.

9. A spring suspension for carrying the body supporting frame of a railroad car, comprising a pair of spaced axles arranged in substantially the same horizontal plane, a car wheel supporting each end of each of said axles, an axle bracket mounted on each end of each of said axles and having its upper end arranged outside of the vertical plane of the annular line of contact of the adjacent car wheel with its rail, a pair of generally parallel torsion rods mounted on each side of said frame at a slight angle to the horizontal and extending transversely of said axles and arranged one above the other and each having its live end arranged above the end of a corresponding axle and its dead end extending beyond the end of the other axle, means for anchoring said dead end of each torsion rod to said frame at a point beyond said end of the other axle, a crank arm secured to the live end of each torsion rod and a shackle pivotally connecting the outer end of each crank arm with the adjacent axle bracket and extending downwardly from said axle bracket to said crank arm, said crank arms, shackles and axle brackets permitting vertical and lateral movement of said axles relative to said frame and said movement being yieldingly resisted by said torsion rods, and the axes of the pivotal connections of each shackle being substantially parallel with the torsion rod associated therewith.

10. A spring suspension for carrying the body supporting frame of a railroad car, comprising a pair of spaced axles arranged in substantially the same horizontal plane, a car wheel supporting each end of each of said axles, an axle bracket mounted on each end of each of said axles and having its upper end arranged outside of the vertical plane of the annular line of contact of the adjacent car wheel with its rail, a pair of torsion rods mounted on each side of said frame at a slight angle to the horizontal and extending transversely of said axles and arranged one above the other and each having its live end arranged above the end of a corresponding axle and its dead end extending beyond the end of the other axle, means for anchoring said dead end of each torsion rod to said frame at a point beyond said end of the other axle, a crank arm secured to the live end of each torsion rod and a shackle pivotally connecting the outer end of each crank arm with the adjacent axle bracket and extending downwardly from said axle bracket to said crank arm, said crank arms, shackles and axle brackets permitting vertical and lateral movement of said axles relative to said frame and said movement being yieldingly resisted by said torsion rods and the upper torsion rod of each pair at each side of said frame extending above the crank arm of the lower torsion rod and the lower torsion rod of each pair at each side of said frame extending below the crank arm of the upper torsion rod.

11. A spring suspension for carrying the body supporting frame of a railroad car, comprising an axle, a car wheel supporting each end of said axle, an axle bracket mounted on each end of said axle and having its upper end arranged outside of the vertical plane of the annular line of contact of the adjacent car wheel with its rail, a generally horizontal torsion rod mounted on each side of said frame and extending transversely of said axle and each having its live end arranged above the adjacent end of said axle, means for anchoring the dead end of each torsion rod to said frame, a crank arm secured to the live end of each torsion rod, a shackle pivotally connecting the outer end of each crank arm with the adjacent axle bracket and extending downwardly from said axle bracket to said crank arm, said crank arms, shackles and axle brackets permitting vertical and lateral movement of said axle relative to said frame and said movement being yieldingly resisted by said torsion rods and a rest formed integrally with each axle bracket and projecting upwardly therefrom at a place below an adjacent part of said frame and on which said frame seats in the event of torsion rod breakage.

ALBERT F. HICKMAN.